US012766667B2

(12) United States Patent
Aida et al.

(10) Patent No.: US 12,766,667 B2
(45) Date of Patent: Oct. 20, 2026

(54) POLISHING STATE ANALYSIS PREDICTION PROGRAM, STORAGE DEVICE, CATHODELUMINESCENCE DEVICE, AND POLISHING STATE ANALYSIS PREDICTION METHOD

(71) Applicants: National University Corporation Nagaoka University of Technology, Nagaoka (JP); Sanoh Industrial Co., Ltd., Tokyo (JP)

(72) Inventors: Hideo Aida, Nagaoka (JP); Natsuko Omiya, Koga (JP)

(73) Assignees: National University Corporation Nagaoka University of Technology, Nagaoka (JP); Sanoh Industrial Co., Ltd., Tokyo (JP)

( * ) Notice: Subject to any disclaimer, the term of this patent is extended or adjusted under 35 U.S.C. 154(b) by 852 days.

(21) Appl. No.: 18/044,862

(22) PCT Filed: Sep. 15, 2021

(86) PCT No.: PCT/JP2021/033940
§ 371 (c)(1),
(2) Date: Sep. 20, 2023

(87) PCT Pub. No.: WO2022/059708
PCT Pub. Date: Mar. 24, 2022

(65) Prior Publication Data

US 2024/0217061 A1 Jul. 4, 2024

(30) Foreign Application Priority Data

Sep. 15, 2020 (JP) ................................ 2020-154193

(51) Int. Cl.
*B24B 49/04* (2006.01)
*B24B 37/005* (2012.01)
(Continued)

(52) U.S. Cl.
CPC ............ *B24B 49/04* (2013.01); *B24B 37/005* (2013.01); *B24B 49/12* (2013.01);
(Continued)

(58) Field of Classification Search
CPC ......... B24B 49/01; B24B 49/12; B24B 37/00; B24B 37/005; G01N 2233/00; G01N 2233/60; G01N 2233/611; G01N 23/2254
See application file for complete search history.

(56) References Cited

U.S. PATENT DOCUMENTS 5,483,568 A 1/1996 Yano et al.
6,468,347 B1 * 10/2002 Motoki ................ C30B 29/406 117/106
(Continued)

FOREIGN PATENT DOCUMENTS

JP 2001102307 A 4/2001
JP 2002359217 A 12/2002
(Continued)

OTHER PUBLICATIONS

Aida et al., "Chemical Mechanical Polishing of Gallium Nitride with Colloidal Silica", Journal of The Electrochemical Society, Oct. 31, 2011, p. H1206-H1212, vol. 158, issue 12.
Supplementary Extended European Search Report re European Patent Application No. 21869394.3 dated Sep. 16, 2024.
(Continued)

*Primary Examiner* — Carlos A. Rivera
(74) *Attorney, Agent, or Firm* — The Webb Law Firm

(57) ABSTRACT

Provided are a polishing state analysis prediction program, a storage, a cathodeluminescence device, and a polishing state analysis prediction method. The polishing state analysis prediction program to predict a future polishing state of a polishing-target substrate to be polished based on a cathodeluminescence image of the polishing-target substrate, the image being obtained by a cathodeluminescence method, the program, when executed by a computer, causing the com-
(Continued)

puter to perform: calculating average light emission intensity data or average luminance data from the cathodeluminescence image of each predetermined time after start of polishing the substrate; and plotting the average light emission intensity data or the average luminance data, and deriving a formula representing a fitting curve resulted from the plotting by using a predetermined function.

10 Claims, 6 Drawing Sheets

(51) Int. Cl.
*B24B 49/12* (2006.01)
*G01N 23/2254* (2018.01)

(52) U.S. Cl.
CPC .................... *G01N 23/2254* (2013.01); *G01N 2223/611* (2013.01); *G01N 2223/6116* (2013.01)

(56) References Cited

U.S. PATENT DOCUMENTS

| | | | | |
|---|---|---|---|---|
| 7,828,628 | B2 * | 11/2010 | Aoki | H01L 21/02024 451/37 |
| 8,369,978 | B2 * | 2/2013 | David | B24B 37/005 700/109 |
| 8,547,538 | B2 * | 10/2013 | David | B24B 49/12 356/72 |
| 11,776,114 | B2 | 10/2023 | Tsutsukawa et al. | |
| 2011/0281501 | A1 | 11/2011 | Qian et al. | |
| 2017/0368661 | A1 * | 12/2017 | Nakamura | B24B 49/08 |

FOREIGN PATENT DOCUMENTS

| | | | |
|---|---|---|---|
| JP | 201219114 | A | 1/2012 |
| JP | 2013120795 | A | 6/2013 |
| JP | 2014512693 | A | 5/2014 |
| JP | 201644095 | A | 4/2016 |
| KR | 1020200099665 | A | 8/2020 |
| WO | 2010062497 | A2 | 6/2010 |
| WO | 2020110629 | A1 | 6/2020 |

* cited by examiner

POLISHING STATE ANALYSIS PREDICTION PROGRAM, STORAGE DEVICE, CATHODELUMINESCENCE DEVICE, AND POLISHING STATE ANALYSIS PREDICTION METHOD

CROSS-REFERENCE TO RELATED APPLICATIONS

This application is the United States national phase of International Application No. PCT/JP2021/033940 filed Sep. 15, 2021, and claims priority to Japanese Patent Application No. 2020-154193 filed Sep. 15, 2020, the disclosures of which are hereby incorporated by reference in their entireties.

BACKGROUND

Field

The present invention relates to a polishing state analysis prediction program, a storage, a cathodeluminescence device, and a polishing state analysis prediction method of analyzing and predicting a polishing state of a substrate.

Description of Related Art

A gallium nitride (GaN) substrate is expected to expand in the market as a substrate for next-generation semiconductor devices. In order to use a GaN substrate for a device, crystals obtained by various bulk crystal growth processes need to be cut out and shaped into a substrate shape, and finally, the substrate surface needs to be finished in an atomic order, flat, and undamaged mirror surface state. Since GaN is a highly brittle material that is mechanically high in hardness and chemically stable, it is difficult to be polished, and known as a so-called difficult-to polish material.

According to research and development in recent years, mirror polishing of the surface of the GaN substrate can be performed mainly by a grinding/mechanical polishing process using diamond abrasive grains. A particularly important step that determines the state of a substrate surface to be used for device growth is the final surface finishing step. In this step, chemical mechanical polishing (hereinafter, it is simply referred to as "CMP") using colloidal silica slurry is generally often used, but this polishing achieves polishing efficiency of only several to several tens of nanometers per hour, and a new polishing method for increasing efficiency is desired.

Various studies for improving polishing efficiency include development of new polishing techniques, utilization of new chemical reactions, optimization and development of abrasive materials and abrasive sub-materials such as abrasive pads. In the course of these studies, data reflecting damage to the substrate is analyzed to evaluate the polishing rates for various polishing conditions.

A cathodeluminescence (CL) method is a method of evaluating the presence or absence of an affected layer in final surface finishing polishing of a GaN material. When the surface of the GaN crystal material is irradiated with an electron beam, CL light based on a light emission recombination process in the vicinity of the surface of the GaN crystal can be observed. However, a non-light emission recombination site is formed in an inherent crystal defect portion of a crystal material or a mechanical processing damaged portion, and no CL light is observed.

Generally, the carrier capture cross-sectional area at the non-light emission recombination site is greater than the carrier capture cross-unital area at the light emission recombination site. For this reason, it is known that there is a significant difference in intensity between CL light in a uniform crystal portion generated at a light-emitting recombination site and CL light in a crystal defect or damage generated at a non-light emission recombination site. In evaluation using the CL method, an electron beam irradiation function mounted mainly on a scanning electron microscope (hereinafter, it is simply referred to as "SEM") is used, and an intensity mapping image (hereinafter, it is simply referred to as a "CL image") of CL light can be obtained as in an SEM image. By using the CL image, it is possible to visualize not the processed scratch present on the surface of the substrate but the affected layer present under the surface of the substrate as a black line in which non-light emission recombination sites are formed linearly. Therefore, it is extremely effective as a method of determining the presence or absence of processing damage present in the GaN substrate, and is reported in, for example, Non Patent Document 1.

Patent Document 1 discloses a method of observing defects using the CL method. This document discloses a method in which chamfering polishing of a GaN wafer is performed in order to suppress chipping in which edges are chipped during polishing of a GaN wafer, and a chamfering polishing step is performed until dark rotation, which is a crystal defect, is confirmed in a CL image.

CITATION LIST

Patent Document

Patent Document 1: Japanese Unexamined Patent Application Publication No. 2013-120795

Non Patent Document

Non Patent Document 1: Hideo Aida, Hidetoshi Takeda, Koji Koyama, Haruji Katakura, Kazuhiko Sunakawa, and Toshiro Doi, "Chemical Mechanical Polishing of Galliumu Nitride with Colloidal Silica", Journal of The Electrochemical Society, 158 (12) H1206-H1212 (2011).

SUMMARY

However, as described in the above documents, the conventional CL method evaluates the presence or absence of an affected layer by a surface image alone. Although it is possible to visually confirm the reduction in the number of black lines due to non-light emission recombination with respect to the polishing time by observing the temporal change of the CL image, quantitative evaluation is not performed. As described above, although the CL method is extremely effective for the final surface observation of the GaN substrate, quantitative evaluation using the CL method is required in order to improve the polishing efficiency of the GaN substrate with an extremely slow polishing rate.

Further, since evaluation of the polishing rate of the GaN substrate needs a lot of time, it is not easy to control the polishing time. In the case of a GaN crystal material with an extremely slow polishing rate, it is difficult to accurately obtain the polishing rate in a short time. For example, if the polishing rate for a GaN substrate is 10 nm/h, even if a new process with twice the polishing rate has been developed, the polishing rate is still 20 nm/h. In this way, when polishing is performed at an extremely slow polishing rate, since the difference between the polishing rates is too small, there is a high possibility that this difference is failed to be detected.

Conventionally, in order to accurately grasp the polishing rate under each polishing condition, the polishing condition has needed to be considered by spending a sufficient polishing time to the extent that the polishing rate can be measured. In order to accurately detect the difference in the polishing rate of the GaN material, a polishing test needs to be carried out for tens to hundreds of hours. Even if a sufficient time is spent in the polishing test, the polishing does not necessarily have a polishing condition having an effect of improving the polishing efficiency. As described above, since the study of the polishing conditions of materials with an extremely low polishing efficiency by the CMP method requires a lot of time to evaluate the polishing rate, it is needed to easily perform a polishing test and extract optimal polishing conditions to control the manufacturing time.

Further, in the CL method, the observation field of view is limited as in SEM, and it is not easy to confirm the removal of the affected layer on the entire surface of the substrate. In the case of polishing a difficult-to-process substrate, since the polishing rate is slow, if each substrate to be polished is observed every predetermined time until the polishing is finished as in the related art, further time is further wasted.

Thus, it is desirable to quantitatively evaluate the polishing rate and the final polishing time which needs to be objectively grasped in order to improve the polishing efficiency in a short time.

Accordingly, it is an object of the present invention to provide a polishing state analysis prediction program, a storage, a cathodeluminescence device, and a polishing state analysis prediction method that can contribute to an increase in the efficiency of polishing by objectively grasping the surface state of a substrate at an initial stage of polishing of the substrate and estimating a polishing rate and a final polishing time in a short time.

In the present invention, in order to easily evaluate a polishing rate at an initial stage of polishing in polishing a difficult-to-polish substrate such as GaN, studies have been made to grasp a change in a CL image using a CL method. The CL method is a method in which an electron beam is emitted onto a substrate at a predetermined acceleration voltage, and light from a generated electron-hole pair is captured. When the substrate is irradiated with an electron beam, excessive minority carriers are generated. The lifetime of the excessive minority carriers is expressed using the light emission recombination lifetime in which electron-hole pairs emit energy with light and the non-light emission recombination lifetime in which electron-hole pairs emit energy with heat.

On the other hand, the light emission intensity I of the CL light is proportional to the ratio of the light emission recombination lifetime to the recombination lifetime of the entire excessive minority carrier. Based on this ratio and the recombination lifetime of the excessive minority carriers, the light emission intensity I can be expressed using the density of the recombination sites, the capture cross-unital area, and the carrier speed.

Here, it is considered that the strength of the processing damage applied to the substrate decreases exponentially in the depth direction. Therefore, the light emission intensity I was further studied based on the fact that the decrease tendency was shown. As a result, it was found that the quantitative change in the light emission intensity in the CL image for each polishing time can be grasped in a short time by fitting the change in the emission intensity in the polishing time with a predetermined function. Since the light emission intensity I and the luminance of the CL image are proportional to each other, the above principle can be applied to both the light emission intensity I and the image luminance L. Based on this finding, the polishing rate can be estimated objectively, and the present invention was completed.

Further, according to the present invention, when fitting is performed using a logistic function, it is found that the light emission intensity or luminance hardly changes in the CL image in a range in which the light emission intensity or luminance is close to the upper limit value. Further, it has been found that the polishing time until a change in light emission intensity or luminance is hardly observed is the initial stage of polishing. Therefore, it was considered that the final polishing time can be predicted without observing the entire surface of the substrate by using the substrate polished for such a time as to hardly show a change in light emission intensity or luminance, and further investigations were made. When attention was paid to the black line density of the CL image at various polishing time in a situation where the substrate after the initial polishing was further polished, it was possible to accurately predict the final polishing end time in a shorter time than before, and the present invention was completed.

The present invention completed based on such findings is not limited to a GaN substrate, and can also be applied to a group of materials in which the relationship between light emission and non-light emission is reversed as compared with the exemplified GaN.

The present invention obtained based on these findings is as follows.

(1) A polishing state analysis prediction program to predict a future polishing state of a polishing-target substrate to be polished based on a cathodeluminescence image of the polishing-target substrate, the image being obtained by a cathodeluminescence method, the program, when executed by a computer, causing the computer to perform:

calculating average light emission intensity data or average luminance data from the cathodeluminescence image of each predetermined time after start of polishing the substrate; and plotting the average light emission intensity data or the average luminance data, and deriving a formula representing a fitting curve resulted from the plotting by using a predetermined function.

(2) The polishing state analysis prediction program according to (1), wherein the function is a logistic function.

(3) The polishing state analysis prediction program according to (1) or (2), wherein the function is represented by formula (1) or formula (2) below:

[Math 1]

$$I(t) = \frac{H}{1 + e^{-2a(t-T)}} \quad (1)$$

$$L(t) = \frac{G}{1 + e^{-2a(t-T)}} \quad (2)$$

where in the formulas (1) and (2), I(t) is light emission intensity of CL light at a time t in the polishing, H is an upper limit value of the formula (1), L(t) is luminance at a time t in the polishing, G is an upper limit value of the formula (2), and T and a are constants obtained when deriving each formula of the fitting curve.

(4) A polishing state analysis prediction program to predict final polishing time of a polishing-target substrate to be polished based on a cathodeluminescence image of the polishing-target substrate, the image being obtained by a cathodeluminescence method, the program, when executed by a computer, causing the computer to perform:

the substrate having been polished until a polishing time at which a value reaches 0.9 or more times and less than 1 time an upper limit value of a fitting curve derived by the polishing state analysis prediction program according to (2) or (3), calculating a black line density from the cathodeluminescence image of each predetermined time under a circumstance in which the substrate is further subjected to polishing;

deriving a formula representing a fitting linear line by plotting each calculated black line density and fitting a plot of a polishing time range in which the black line density decreases from $10^6$ $cm^{-2}$ to $10^4$ $cm^{-2}$ by using a linear function; and calculating as the final polishing time which is taken for the black line density in the formula to reach a threshold of less than $10^4$ $cm^{-2}$.

(5) A computer-readable storage storing therein the polishing state analysis prediction program according to any one of (1) to (4).

(6) A cathodeluminescence device configured to predict a future polishing state of a polishing-target substrate to be polished based on a cathodeluminescence image of the polishing-target substrate, the image being obtained by a cathodeluminescence method, the device comprising:

a cathodeluminescence image obtaining unit configured to obtain the cathodeluminescence image of each predetermined time after start of polishing;

an average data calculating unit configured to calculate average light emission intensity data or average luminance data of each cathodeluminescence image from the cathodeluminescence images obtained by the cathodeluminescence image obtaining unit; and a formula deriving unit configured to plot the average light emission intensity data or the average luminance data calculated by the average data calculating unit, and derive a formula of a fitting curve resulted from the plotting by using a predetermined function.

(7) A cathodeluminescence device configured to predict final polishing time of a polishing-target substrate to be polished based on a cathodeluminescence image of the polishing-target substrate, the image being obtained by a cathodeluminescence method, the substrate having been polished until a polishing time at which a value reaches 0.9 or more times and less than 1 time an upper limit value of a fitting curve derived by the polishing state analysis prediction program according to (2) or (3), the device comprising:

a cathodeluminescence image obtaining unit configured to obtain the cathodeluminescence images under a circumstance in which the substrate is further subjected to polishing;

a black line density calculating unit configured to calculate a black line density from each cathodeluminescence image obtained by the cathodeluminescence image obtaining unit;

a data extracting unit configured to plot each black line density calculated by the black line density calculating unit and extract a plot of a polishing time range in which a black line density decreases from $10^6$ $cm^{-2}$ to $10^4$ $cm^{-2}$; and a fitting linear line deriving unit configured to perform a linear function fitting in the plot extracted by the data extracting unit, and derive a formula representing a fitting linear line; and a final polishing time calculating unit configured to calculate as final polishing time which is taken for a black line density in the formula to reach a threshold of less than $10^4$ $cm^{-2}$, the formula being derived by the fitting linear line deriving unit.

(8) A polishing state analysis prediction method of causing a computer to predict a future polishing state of a polishing-target substrate to be polished based on a cathodeluminescence image of the polishing-target substrate, the image being obtained by a cathodeluminescence method, the polishing state analysis prediction method comprising:

calculating average light emission intensity data or average luminance data of each cathodeluminescence image from the cathodeluminescence image of each predetermined time after start of polishing; and plotting the average light emission intensity data or the average luminance data, and deriving a formula representing a fitting curve resulted from the plotting by using a predetermined function.

(9) A polishing state analysis predicting method of causing a computer to predict final polishing time of a polishing-target substrate to be polished based on a cathodeluminescence image of the polishing-target substrate, the image being obtained by a cathodeluminescence method, the polishing state analysis prediction method comprising:

the substrate having been polished until a polishing time at which a value reaches 0.9 or more times and less than 1 time an upper limit value of a fitting curve derived by the polishing state analysis prediction program according to (2) or (3), calculating a black line density from the cathodeluminescence image of each predetermined time under a circumstance in which the substrate is further subjected to polishing;

deriving a formula representing a fitting linear line by plotting each calculated a black line density and fitting a plot of a polishing time range in which a black line density decreases from $10^6$ $cm^{-2}$ to $10^4$ $cm^{-2}$ by using a linear function; and calculating as final polishing time which is taken for the black line density in the formula to reach a threshold of less than $10^4$ $cm^{-2}$.

BRIEF DESCRIPTION OF THE DRAWINGS

FIG. 4A is a flowchart when a polishing rate calculating unit is not provided in FIG. 3, and FIG. 4B is a flowchart when the polishing rate calculating unit is provided in FIG. 3.

FIG. 7A is a diagram showing fitting results using a linear function, FIG. 7B is a diagram showing fitting results using an exponential function, and FIG. 7C is a diagram showing fitting results using a logistic function.

FIG. 10 is a CL image of a substrate polished under a polishing condition 2 of the first embodiment, in which FIG. 10A shows a CL image at a polishing time of 90 minutes, FIG. 10B shows a CL image at a polishing time of 130 minutes, FIG. 10C shows a CL image at a polishing time of 180 minutes, FIG. 10D shows a CL image at a polishing time of 240 minutes, FIG. 10E shows a CL image at a polishing time of 300 minutes, and FIG. 10F shows a CL image at a polishing time of 360 minutes.

FIG. 11A shows a linear line obtained from actual black line density data and an estimated linear line estimated from a black line density of 90 to 360 minutes, FIG. 11B shows a linear line obtained from actual black line density data and an estimated linear line estimated from a black line density of 130 to 360 minutes, and FIG. 11C shows a linear line obtained from actual black line density data and an estimated linear estimated from a black line density of 180 to 360 minutes, FIG. 11D shows a linear line obtained from actual black line density data and an estimated linear line estimated from the black line density of 240 to 360 minutes.

DETAILED DESCRIPTION

Embodiments of the present invention will be described in detail with reference to the drawings. The present invention is not limited to the following embodiments. The matters described in the respective embodiments may be combined.

An embodiment described below shows an example of a polishing state analysis prediction program (hereinafter, it is simply referred to as a "program"). The program according to the present embodiment constitutes software that is installed in a storage of a general-purpose computer connected to a cathodeluminescence device or that is stored in the storage, which is read and executed.

Overview of a Cathodeluminescence Device

Figure 1:
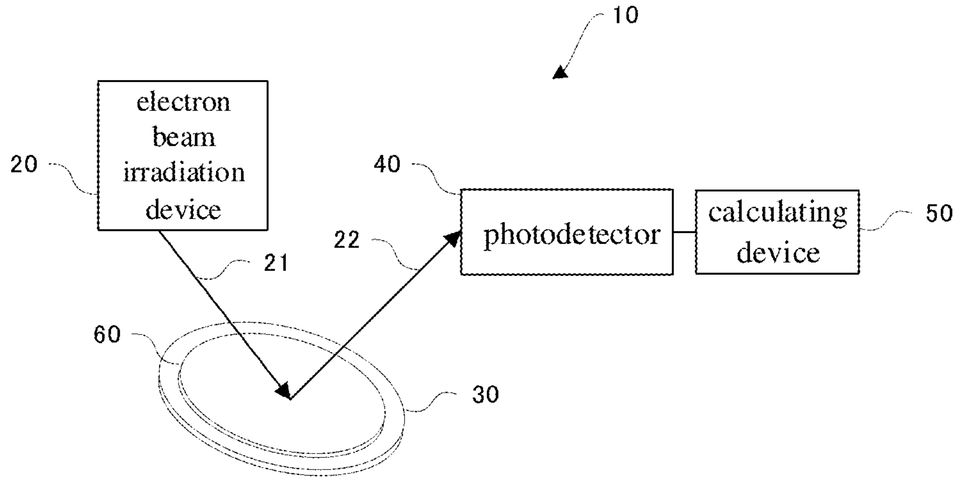
FIG. 1 is a schematic diagram of a cathodeluminescence device according to an embodiment.

FIG. 1 is a schematic diagram of a cathodeluminescence (hereinafter, it is referred to as "CL") device 10 according to an embodiment of the present invention. The CL device 10 includes an electron beam irradiation device 20, a sample stage 30, a CL photodetector 40, and a calculating device 50. The electron beam irradiation device 20 emits an electron beam 21 onto a substrate 60 placed on the sample stage 30. The CL photodetector 40 detects CL light 22 emitted from the substrate 60. The calculating device 50 performs various processes based on data detected by the CL photodetector 40. Since the electron beam irradiation device 20, the sample stage 30, and the calculating device 50 may be provided in the SEM, the CL device 10 may be incorporated in the SEM.

Overview of the Calculating Device and a Storage

Figure 2:
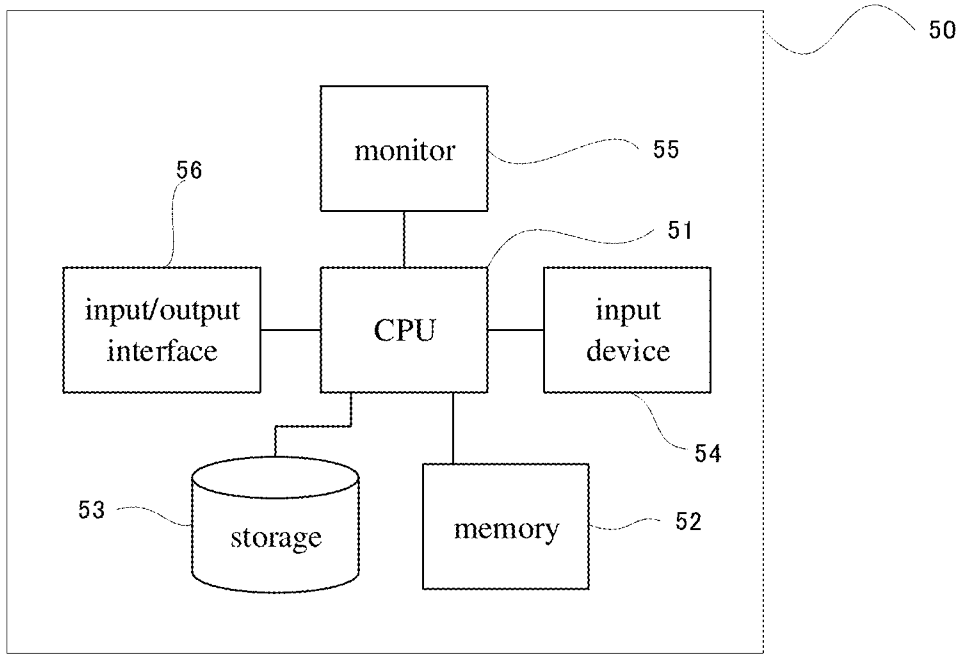
FIG. 2 is a diagram showing a hardware configuration of a calculating device used in the cathodeluminescence device according to the present embodiment.

FIG. 2 is a diagram showing a hardware configuration of the calculating device 50 used in the CL device according to the present embodiment. The calculating device 50 includes a CPU (Central Processing Unit) 51 that performs various kinds of processing, a memory 52, a non-volatile storage 53, an input device 54 such as a keyboard or a microphone, a monitor 55, and an input/output interface 56.

The CPU 51 loads a program stored in the storage 53 into the memory 52 and executes the program. Each function described later is executed by the CPU 51. The storage 53 stores various data in addition to the program. The storage 53 is a non-volatile memory such as a ROM (Random Access Memory), an HDD that can be externally connected to the calculating device 50, or the like. Further, the storage may be a medium that can store a program mainly magnetically or optically, such as a floppy (registered trademark) disc, a CD-ROM or the like.

The program stored in the storage 53 is loaded into the memory 52. The input device 54 is a device for inputting information. The execution result of the CPU 51 and the like are displayed on the monitor 55. The input/output interface 56 is an interface for receiving data detected by the CL photodetector 40, and for transmitting data to an external device.

The substrate 60 applied to the present embodiment is not limited to a GaN substrate. The present invention is also applicable to both a substrate material whose ratios of light emission recombination and non-light emission recombination are changed by polishing and a substrate material that exhibits CL light emission characteristics when damaged by polishing. That is, the present invention can also be applied to a group of materials in which the relationship between light emission and non-light emission is reversed as compared with the exemplified GaN. Examples of such a material include GaN, GaAs, ruby, diamond, ZnS, ZnSe, CdS, and MgO.

The hardware configurations of the CL device and the calculating device are common to any of the following embodiments. Therefore, the description thereof will be skipped.

Hereinafter, functions of the calculating device will be described in detail. The embodiments can be combined with each other, and are not limited to the aspects described in the embodiments.

1. First Embodiment

Figure 3:
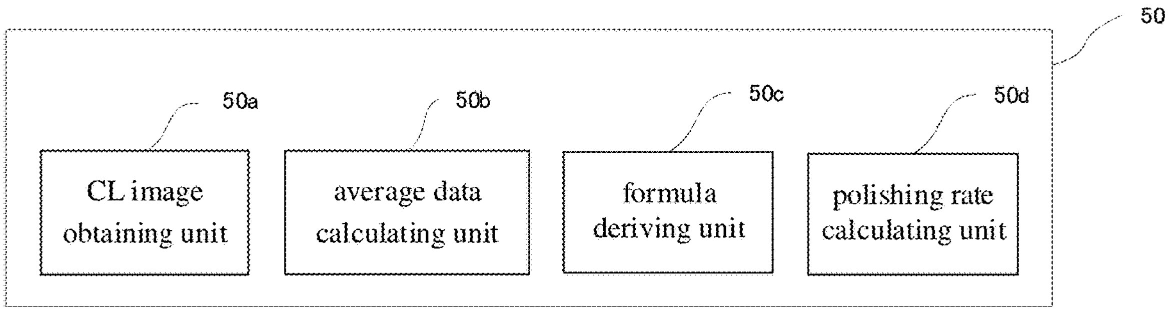
FIG. 3 is a diagram showing a functional configuration of a calculating device used in a program according to a first embodiment.

FIG. 3 is a diagram showing a functional configuration of the calculating device 50 used in a program according to a first embodiment. The calculating device 50 includes a CL image obtaining unit 50*a*, an average data calculating unit 50*b*, and a formula deriving unit 50*c*. Preferably, a polishing rate calculating unit 50*d* is provided. When the polishing rate calculating unit 50*d* is not provided, this function can be manually supported. These functions are implemented by cooperation of the above-described hardware resources.

The CL image obtaining unit 50*a* obtains a CL image for each polishing time based on data such as CL light and polishing time (a polishing time) received by the input/output interface 56. The average data calculating unit 50*b* calculates average light emission intensity data or average luminance data from each CL image. The formula deriving unit 50*c* plots the average light emission intensity data or average luminance data obtained from each CL image, and derives the formula of a fitting curve using a predetermined function. The polishing rate calculating unit 50*d* calculates a polishing rate from the derived formula.

Figure 4:
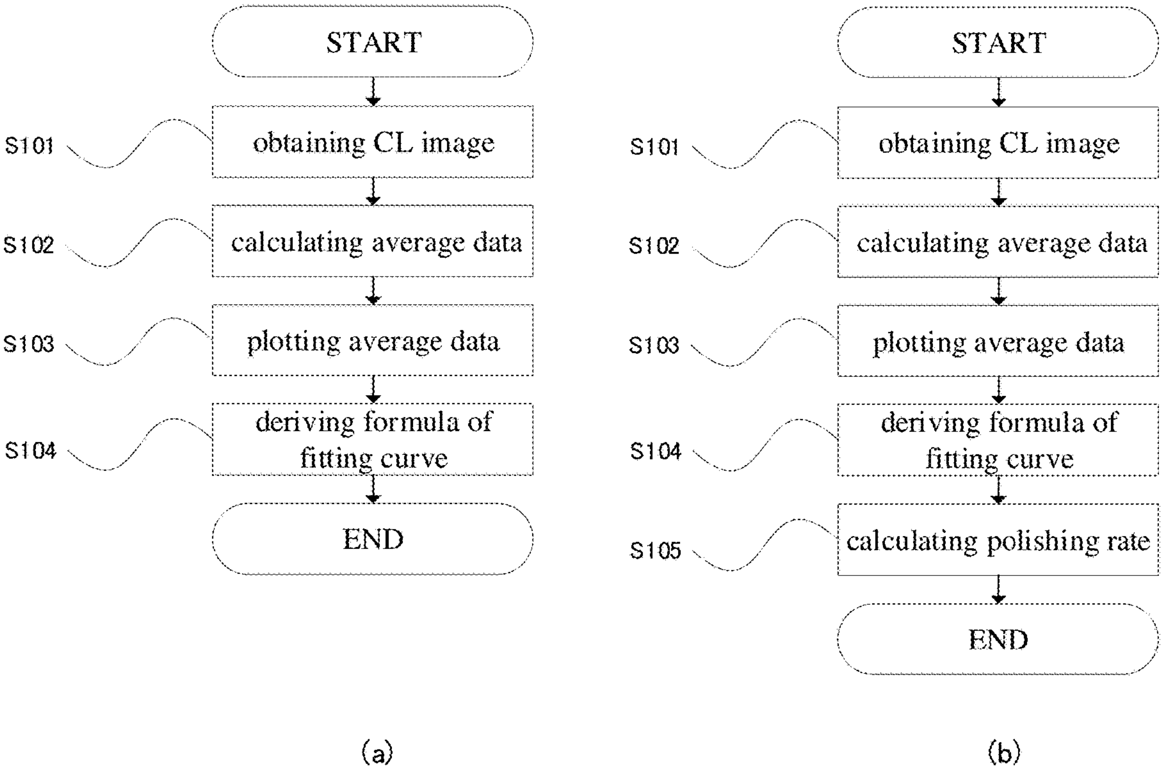
FIG. 4 is a flowchart of a polishing state analysis prediction method according to the first embodiment.

FIG. 4 is a flowchart of a polishing state analysis prediction method according to the first embodiment, FIG. 4A is a flowchart when the polishing rate calculating unit is not provided in FIG. 3, and FIG. 4B is a flowchart when the polishing rate calculating unit is provided in FIG. 3. The CL image obtaining unit 50*a* obtains a CL image for each polishing time (S101). After a predetermined time has elapsed from the start of polishing, the substrate is taken out from a polishing device, placed on a sample stage of a scanning electron microscope (hereinafter, it is referred to as "SEM"), a surface of the substrate is irradiated with an electron beam, and CL light emitted from the substrate is measured by a detector to obtain a CL image. The CL image can be observed at an acceleration voltage of 10 kV, a probe current of "90", a working distance (W.D.) of 22.5 mm, and a magnification of 2000 times using, for example, a scanning electron microscope (SEM, TOPCON CORPORATION, manufactured by Semiconductor Co., Ltd., Model No. sm-300) including a CL photodetector. The CL image is obtained every predetermined polishing time of the substrate. Further, an image obtaining time is associated with the CL image, and information on the polishing time is also obtained.

Then, the average data calculating unit 50*b* calculates average light emission intensity data or average luminance data (average value of pixel values) for each of the obtained CL images (S102). This can be easily obtained, for example, using image analysis software (sm-300 Series) included in the SEM.

Next, the formula deriving unit 50*c* plots the average light emission intensity or average luminance data obtained by the average data calculating unit 50*b* by setting the horizontal axis as the polishing time and the vertical axis as the average light emission intensity or average luminance, as indicated by "●" and "▲" in FIG. 6 described later (S103). Then, for this plot, the formula of a fitting curve is derived using a predetermined function (S104). Various functions such as a primary function, a secondary function, an exponential function, and a logistic function can be used for fitting. A logistic function is preferred, and the following formulas (1) and (2) are particularly preferred.

[Math 2]

$$I(t) = \frac{H}{1 - e^{-2a(t-T)}} \tag{1}$$

$$L(t) = \frac{G}{1 + e^{-2a(t-T)}} \tag{2}$$

In the formulas (1) and (2), I(t) is the light emission intensity of the CL light at a time t of the polishing, H is the upper limit value of the formula (1), L(t) is the luminance at the time t of the polishing, G is the upper limit value of the formula (2), and T and a are constants obtained when deriving the formulas of the fitting curve.

A method of deriving the formulas (1) and (2) will be described in detail.

The CL method is a method in which an electron beam is emitted onto a substrate at a predetermined acceleration voltage, and light from a generated electron-hole pair is captured. When the substrate is irradiated with an electron beam, excessive minority carriers are generated, and a lifetime $\tau$ of the excessive minority carriers is expressed by formula (3) using a light emission recombination lifetime $\tau_r$ in which electron hole pairs emit energy with light and a non-light emission recombination lifetime $\tau_{nr}$ in which electron hole pairs emit energy with heat.

[Math 3]

$$\frac{1}{\tau} = \frac{1}{\tau_r} + \frac{1}{\tau_{nr}} \tag{3}$$

On the other hand, the light emission intensity I of the CL light is proportional to the ratio of the light emission recombination lifetime to the recombination lifetime of the entire excessive minority carrier. Based on this ratio and the recombination lifetime of the excessive minority carrier, the light emission intensity I can be expressed by formula (6) using formula (4) and formula (5) using a density $N_r$ of the light emission recombination site, a capture cross-unital area $\sigma_r$ of the light emission recombination carrier, a light emission recombination carrier velocity v, a density $N_{nr}$ of the non-light emission recombination site, a capture cross-unital area Cur of the non-light emission recombination carrier, and a non-light emission recombination carrier velocity v.

[Math 4]

$$\tau_r^{-1} = N_r \sigma_r v \tag{4}$$

$$\tau_{nr}^{-1} = N_{nr} \sigma_{nr} v \tag{5}$$

$$I \propto \frac{\tau}{\tau_r} = \frac{1}{1 + \frac{\tau_r}{\tau_{nr}}} = \frac{1}{1 + \frac{N_{nr}\sigma_{nr}v}{N_r\sigma_r v}} \tag{6}$$

In the present embodiment, the polishing rate is calculated simply by focusing on the change in the polishing time of the CL image using the formula (6).

For example, GaN basically has light emission recombination sites for CL measurements. The inherent crystal defect of the crystal becomes a non-light emission recombination site. Such defects are recognized as black dots having a diameter of 1 μm or less in the CL image. In recent years, GaN has a defect density, i.e., a black dot density of approximately $10^7$ $cm^{-2}$ or less, which is considered to not significantly affect the present invention.

When such a substrate is mechanically processed, damage occurs. Not only a mechanical fractured layer or scratch is formed on the surface of the substrate, but also a damaged layer is formed in the depth direction. Damage is strongest near the surface and gradually decreases as it enters the interior from the surface. For this reason, at a position deeper than the depth at which processing damage does not occur, an intrinsic crystal layer in which crystal defects other than those of GaN are not present is formed. Thus, it can be assumed that damage decreases exponentially with respect to the depth direction.

A polishing finishing step is performed to remove an affected layer of the mechanically processed GaN substrate without mechanical damaging the substrate or under the condition that damage is extremely minute even when the substrate is damaged. Here, the damage made to the substrate before polishing decreases exponentially with respect to the depth direction from the substrate surface. In other words, the number of non-light emission recombination sites observed by the CL method exponentially decreases as the polishing progresses and the resurfacing layer of the substrate is polished away. In contrast, the number of light emission recombination sites observed by the CL method is supposed to increase exponentially.

In view of such a new idea, the density $N_r$ of the light emission recombination site and the density $N_{nr}$ of the non-light emission recombination site with respect to the polishing time t can be represented by formula (7) and formula (8), respectively.

[Math 5]

$$N_r(t) = Ae^{at} \tag{7}$$

$$N_{nr}(t) = Ae^{-at} \tag{8}$$

In the formulas (7) and (8), A and a are constants.

By substituting these into the formula (6), as shown in formula (9), the formula of the polishing time change I(t) of the CL light emission intensity is derived in the form of a logistic function.

[Math 6]

$$I(t) \propto \frac{1}{1 + \frac{Ae^{-at}\sigma_{nf}}{Ae^{at}\sigma_r}} = \frac{1}{1 + \alpha e^{-2at}} = \frac{1}{1 + e^{-2a(t-T)}} \tag{9}$$

In the formula (9), $\alpha=\sigma_{nr}/\sigma_r$, and $T=\ln\alpha/2a$.

Here, a contrast C of the CL image at a place where the light emission intensity I of the CL light is shown can be expressed by formula (10) using the light emission intensity $I_0$ of reference CL light at a place where the light emission intensity is uniform.

[Math 7]

$$C = \frac{I_0 - I}{I_0} \tag{10}$$

Since the CL image represents the contrast C as a 256-level grayscale image, the luminance L is represented by formula (11).

[Math 8]

$$L \propto 1 - C = \frac{I}{I_0} \tag{11}$$

Therefore, since L(t) is proportional to I(t), formula (12) can be derived by formula (9).

[Math 9]

$$I(t) \propto L(t) \propto \frac{1}{1 + e^{-2a(t-T)}} \tag{12}$$

Figure 5:
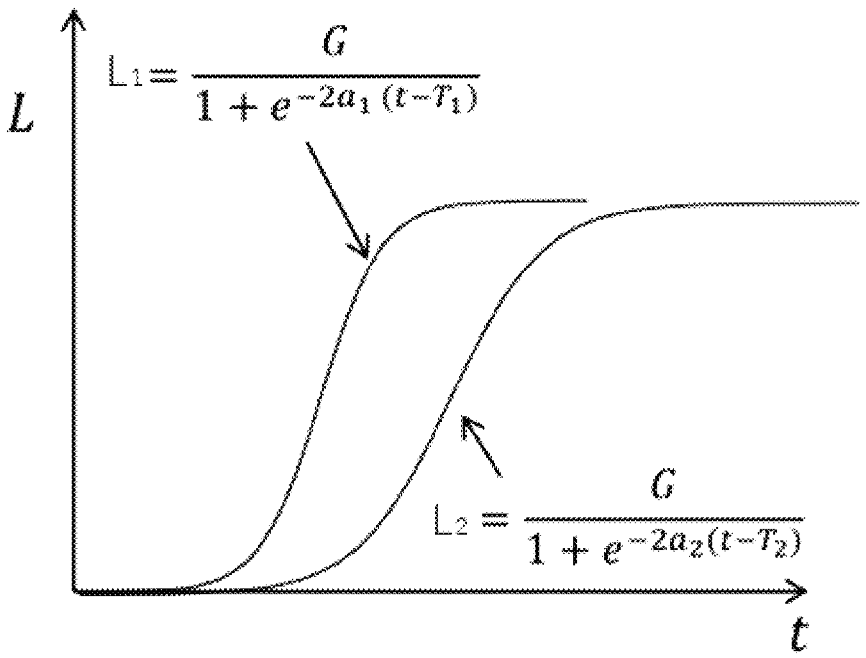
FIG. 5 is a diagram showing an example of the relationship between luminance L and polishing time t under each polishing condition in the first embodiment.

FIG. 5 is a diagram showing an example of the relationship between the luminance L and the polishing time t under each polishing condition in the first embodiment. In FIG. 5, a polishing condition 1 is defined as a reference polishing condition for which the polishing rate is obtained in advance. A formula $L_1$ of a fitting curve using a1 and $T_1$ is obtained from the following formula (1) by plotting the average luminance data under the polishing condition 1 as a reference. In addition, the average luminance data is plotted under a polishing condition 2 in which the polishing rate is unknown. A formula $L_2$ of a fitting curve using $a_2$ and $T_2$ is obtained from the following formula (2). The two formulas shown in FIG. 5 can be expressed as a function of L(t) by multiplying the formula (12) by G. Further, by multiplying the formula (12) by H, it can be expressed as a function of I(t). FIG. 5 shows an example of a case in which polishing performed under both conditions result in the same polishing amount after the polishing ends.

[Math 10]

$$I(t) = \frac{H}{1 + e^{-2a(t-T)}} \tag{1}$$

$$L(t) = \frac{G}{1 + e^{-2a(t-T)}} \tag{2}$$

In the formulas (1) and (2), I(t) is the light emission intensity of the CL light at the time t of the polishing, H is the upper limit value of the formula (1), L(t) is the luminance at the time t of the polishing, G is the upper limit value of the formula (2), and T and a are constants obtained when deriving the formulas of the fitting curve.

A fitting method in the present embodiment is not particularly limited, but after obtaining H or G, fitting can be performed by appropriately assigning numerical values to a and T. Further, it can also be performed by the least squares method.

That is, by the formula (1), it is understood that the light emission intensity of the CL light changes in a logistic function with the polishing time t. Similarly, by the formula (2), it is understood that the average luminance of the CL image changes in a logistic function with the polishing time t. Therefore, the formula (1) or the formula (2) enables for the first time the quantitative expression of the change in the light emission intensity of the CL light and average luminance of the CL image at the polishing time t.

If the calculating device 50 does not include the polishing rate calculating unit 50*d*, the polishing rate is calculated manually. On the other hand, when the calculating device 50 includes the polishing rate calculating unit 50*d*, as shown in FIG. 4B, the polishing rate calculating unit 50*d* calculates the polishing rate based on the formula of a fitting curve (S105).

By using the technical idea described above, when polishing is performed under different polishing conditions on substrates having the same mechanical damage state before the final surface finishing, i.e., substrates subjected to the same processing steps before the final surface finishing, it is possible to easily calculate the polishing rate by comparing a, which is an index in the formula (1) or the formula (2)

obtained from the CL image of the substrate for which a predetermined period of time has passed after the start of polishing. Such simple comparison can be achieved as follows.

The density of the light emission recombination sites at the polishing time t is represented by formulas (13) and (14) under the polishing conditions 1 and 2, respectively.

[Math 11]

$$N_{nr1}^{-1}(t) = Ae^{-a_1 t} \quad (13)$$

$$N_{nr2}^{-1}(t) = Ae^{-a_2 t} \quad (14)$$

If the processing before CMP of the substrate material is the same, when CMP polishing is performed from the substrate surface to the same depth, the density of the light emission recombination sites is the same. If polishing amounts are the same when the polishing time is a time $t_1$ under the polishing condition 1 (a known polishing rate $r_1$) and when the polishing time is a time $t_2$ under the polishing condition 2 (an unknown polishing rate $r_2$), formula (16) can be derived from formula (15).

[Math 12]

$$N_{nr1}(t_1) = N_{nr2}(t_2) \quad (15)$$

$$a_1 t_1 = a_2 t_2 \quad (16)$$

Assuming that the polishing rate under the polishing condition 1 is $r_1$ and the polishing rate under the polishing condition 2 is $r_2$, formula (17) is obtained because the polishing amounts under both polishing conditions are the same, and formula (18) can be derived from the formulas (17) and (16).

[Math 13]

$$t_1 r_1 = t_2 r_2 \quad (17)$$

$$\frac{a_1}{a_2} = \frac{r_1}{r_2} \quad (18)$$

Therefore, by using the formula (18), the unknown polishing rate $r_2$ can be easily calculated by plotting the average luminance data and using the index $a_2$ under the polishing condition 2, the index $a_1$ under the polishing condition 1, and the polishing rate $r_1$.

This verification result is described in detail below.

Figure 6:
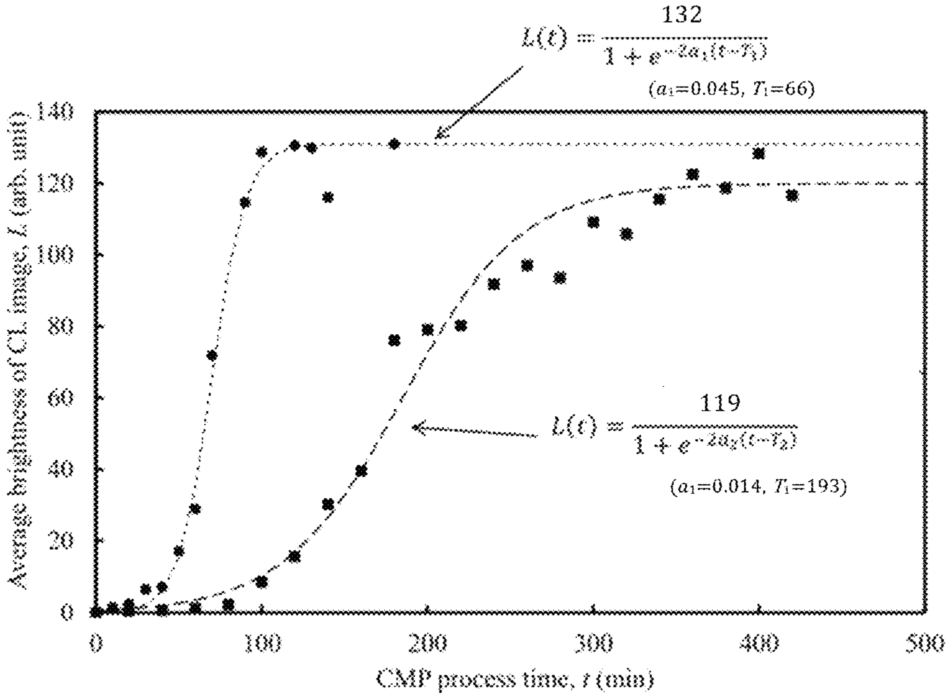
FIG. 6 is a diagram showing a fitting curve after plotting luminance obtained from a CL image for each polishing time and fitting using a logistic function.

FIG. 6 is a diagram showing a fitting curve after plotting luminance obtained from a CL image for each polishing time and fitting using a logistic function.

As described above, in order to calculate the final polishing time under unknown polishing conditions, a known polishing condition is needed as a standard. Here, as shown in FIG. 6, a CL image of up to 440 minutes was obtained every 20 minutes from the start of polishing, average luminance data was calculated for each CL image and plotted as "■" in FIG. 6 by setting the vertical axis as the average luminance of the CL image and the horizontal axis as the polishing time. The polishing rate under the polishing condition 1 indicated by "■" was 60 nm/h. Then, fitting was performed using the formula (2) to obtain the formula of the polishing condition 1 in which the predetermined polishing rate 60 nm/h.

Then, by applying the polishing condition 2 in which the polishing rate is unknown, as shown in FIG. 6, a CL image of up to 140 minutes was obtained every 10 minutes from the start of polishing, average luminance data for each CL image was calculated and plotted as "●" in FIG. 6 by setting the vertical axis as the average luminance of the CL image and the horizontal axis as the polishing time. Fitting was performed using the formula (2) to obtain the formula of the polishing condition 2. The index $a_2$ of the formula obtained from the known polishing condition 1 was compared with the index $a_1$ of the formula obtained from the polishing condition 2 in which the polishing rate is unknown.

$$a1/a2=0.045/0.014\approx 3.2$$

The polishing rate under the polishing condition 2 was estimated to be about 3.2 times that under the polishing condition 1. Therefore, the polishing rate under the polishing condition 2 was estimated to be about 180 nm/h. The polishing time taken for the estimation was about 150 minutes even in manual calculation. Actually, the polishing rate under the polishing condition 2 was calculated by a conventional height gauge method. In consideration of the resolution of the high gauge, as a result of performing the polishing process for a minimum of 30 hours, the polishing rate was about 180 nm/h.

Thus, by using the first embodiment, it is possible to estimate the polishing rate with high efficiency in polishing time of about 1/12. Further, since the estimated polishing rate has been found to be about the same as the actual measured value, it is considered that the polishing rate can be estimated with high accuracy, and therefore, the polishing end time can be estimated with high accuracy.

Figure 7:
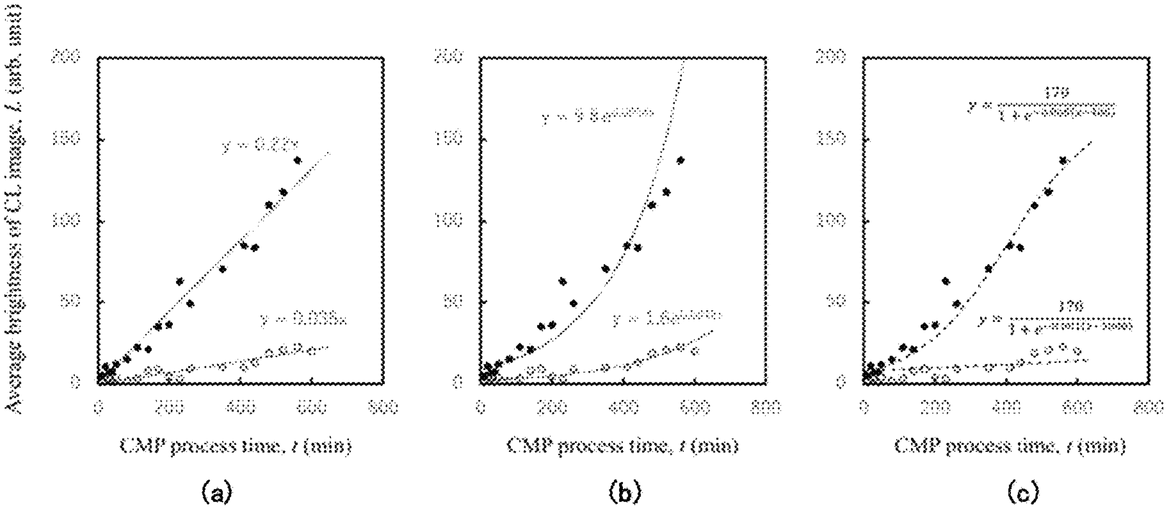
FIG. 7 is a diagram showing fitting curves obtained after plotting luminance obtained from a CL image for each polishing time and fitting using various functions.

In the above, we happened to use the formula (2) for fitting. However, in the present embodiment, fitting can be performed using other functions. FIG. 7 is diagram showing fitting curves after plotting luminance obtained from a CL image for each polishing time and fitting using various functions, FIG. 7A is a diagram showing fitting results using a linear function, FIG. 7B is a diagram showing fitting results using an exponential function, and FIG. 7C is a diagram showing fitting results using a logistic function. In FIG. 7, the GaN substrate was polished under two conditions different from the above-described polishing conditions 1 and 2. In FIG. 7, "○" denotes a polishing condition A with a known polishing rate, and "●" denotes a polishing condition B with an unknown polishing rate.

The polishing rate ratios obtained from FIGS. 7A to 7C were 6.3, 6.1, and 8, respectively. Since the actually measured value of the polishing rate ratio between the polishing conditions A and B was 7.5, although there was some error, results of about 7.5, which is the actually measured polishing rate ratio, was obtained. In particular, logistic function approximation showed the most accurate results.

As described above, according to the first embodiment, a known polishing condition as a standard enables accurate prediction of polishing rates under different conditions in a short time. In the first embodiment, by extending the conventional concept relating to the light emission intensity of the CL light, if the final polishing time under the standard polishing condition is known for a material which can be evaluated by the CL method such as a GaN substrate, the final surface finishing polishing rate under an unknown polishing condition can be estimated by using the formula (18). Thus, the final polishing time can also be predicted.

2. Second Embodiment

The first embodiment has described a mode of estimating a polishing rate extremely quickly using the CL image. On the other hand, a second embodiment describes a mode of quickly estimating the final polishing time in a situation in which it is difficult to confirm the presence of a residual affected layer on the entire surface of a substrate.

The affected layer that remains slightly on the substrate surface adversely affects the use of the substrate for device growth. Therefore, it is desirable that the residual affected layer is not in a wide range of the substrate, possibly not over the entire surface. Since the conventional material has a relatively high polishing rate, the quality of the surface state is assured in which the affected layer does not remain by setting certain extra polishing time.

On the other hand, in the case of a material having an extremely slow polishing rate, such as GaN, the amount of extra polishing time for removing the residual affected layer is large. In order to keep the extra polishing time to the minimum necessary, the necessary extra polishing time needs to be accurately grasped. Therefore, by using the CL method, it is possible to visually evaluate the presence or absence of an affected layer.

However, since the observation area of the CL image is generally several tens of m square, it is difficult to ensure that there is no residual affected layer in a wide range such as per square centimeter or the entire substrate. Although it is believed that the field of view can be widened to 1 to 2 mm square using a special device, the residual affected layer is observed in a very small dotted line, which is less than 0.5 μm wide, in the CL image. Therefore, the wider the field of view, the more difficult it becomes to accurately recognize the residual affected layer. In addition, since the field of view can only be widened to 1 to 2 mm square at most, it is not practical to observe black lines over the entire surface of the substrate.

In the second embodiment, an invention is described that allows observation with a realistic field of view that is feasible with a conventional device as well as accurate observation of very slightly affected layers. More specifically, a mode of estimating minimum necessary extra polishing time from a CL image in a general observation area with a low error will be described.

In the second embodiment, a CL image size of about 50 μm square is assumed as a general CL image size that allows efficient image obtaining by temporarily suspending machining during processing. The number of black lines confirmed in the CL observation area becomes a level that can be counted when the processing comes to the middle of the processing. On the other hand, when the processing progresses until one black line is not observable in the processing area, the black line density becomes approximately $3 \times 10^4$ $cm^{-2}$. Subsequent observations need expansion of the CL observation area, but expanding the observation area is not practical because of the large amount of time needed for observation. Actually, for example, in order to ensure a black line density of 1 $cm^{-2}$, the observation area needs to be enlarged to the range, and except for temporary important development purposes, it is practically impossible to apply the observation to routine development purposes and production management sites.

Accordingly, the second embodiment provides a substrate polishing device and a substrate polishing method of estimating the density of a residual affected layer in a wide area based on the black line density information in the middle plate of processing. As a result, the extra polishing time can be kept to the minimum necessary, so that the efficiency of manufacturing can be improved. Further, since the needed extra polishing time can be accurately grasped, the polishing time can be controlled.

In the second embodiment, the decrease of the black line density with the passage of the polishing time is grasped within the polishing time from a polishing time at which the black line density is $10^6$ $cm^{-2}$ or less to a polishing time at which the black line density is $10^4$ $cm^{-2}$ as the black line density observable in the observation area of a general CL image. By performing estimation calculation in the range of the black line density, it is possible to accurately estimate the black line density in a wide range.

Here, when the logistic function is used for a substrate with a residual affected layer in the first embodiment, the luminance hardly changes in the vicinity of the upper limit value of the function, which indicates that most of the affected layer is removed. There is also a finding that the time period during which the luminance hardly changes is the initial stage of polishing. Therefore, if the substrate used in the second embodiment is a substrate polished for a period of time for which a change in luminance hardly occurs, the final polishing time can be predicted without the need of observing the entire surface of the substrate.

In the second embodiment, after the polishing is started, fitting is performed using the logistic function described in the first embodiment or the formula (2) of the first embodiment, and the polishing is performed until the luminance becomes 0.9 times or more and less than 1 time the upper limit value. It is preferably 0.9 to 0.99 times, more preferably 0.9 to 0.95 times. In this range, since the black line density is larger than $10^6$ $cm^{-2}$, the final polishing time can be predicted in a short time by the mode of the second embodiment. As another mode, a case applicable to the second embodiment is where a CL image is obtained before further polishing of the substrate and the black line density thereof is larger than $10^6$ $cm^{-2}$.

Hereinafter, the second embodiment will be described in detail. Since the hardware configurations of the substrate polishing device and the calculating device according to the second embodiment are the same as those of the first embodiment, the description thereof will be omitted.

Figure 8:
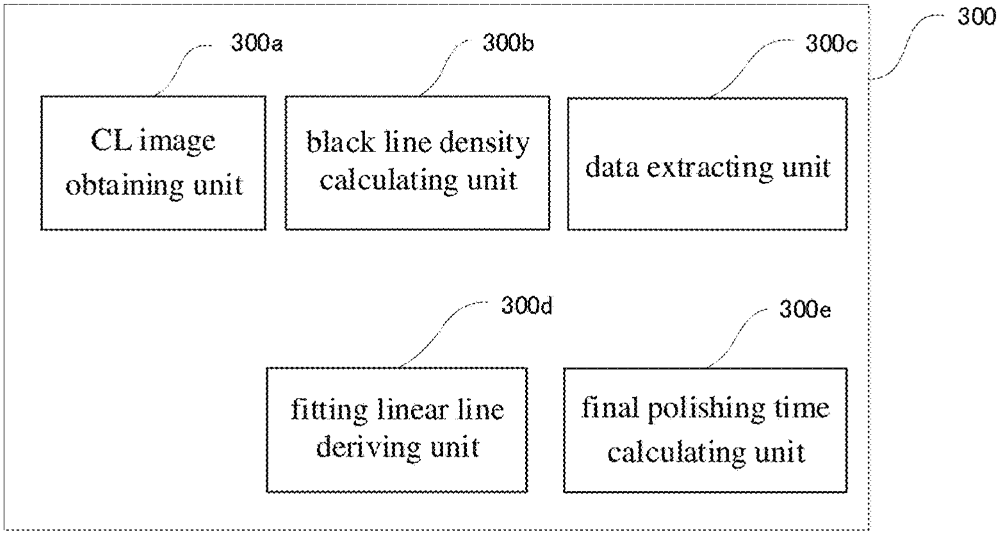
FIG. 8 is a diagram showing a functional configuration of a calculating unit used in a program according to a second embodiment.

FIG. 8 is a diagram showing a functional configuration of a calculating device 300 used in the substrate polishing device according to the second embodiment. The calculating device 300 includes a CL image obtaining unit 300*a*, a black line density calculating unit 300*b*, a data extracting unit 300*c*, a fitting linear line deriving unit 300*d*, and a final polishing time calculating unit 300*e*.

Since the CL image obtaining unit 300*a* has the same function as the CL image obtaining unit 50*a* of the first embodiment, the description thereof will be omitted. The black line density calculating unit 300*b* calculates a black line density from each of the obtained CL images. The data extracting unit 300*c* plots the calculated black line density, and extracts data in a polishing time range in which the black line density decreases from $10^6$ $cm^{-2}$ to $10^4$ $cm^{-2}$. The fitting linear line deriving unit 300*d* performs fitting with a linear function on the plot of the extracted black line density, and derives a formula representing the fitting linear line. The final polishing time calculating unit 300*e* reads a threshold which is a predetermined black line density of less than $10^4$ $cm^{-2}$ from the storage 53, and calculates the time at which the black line density reaches the threshold as the final polishing time.

Figure 9:
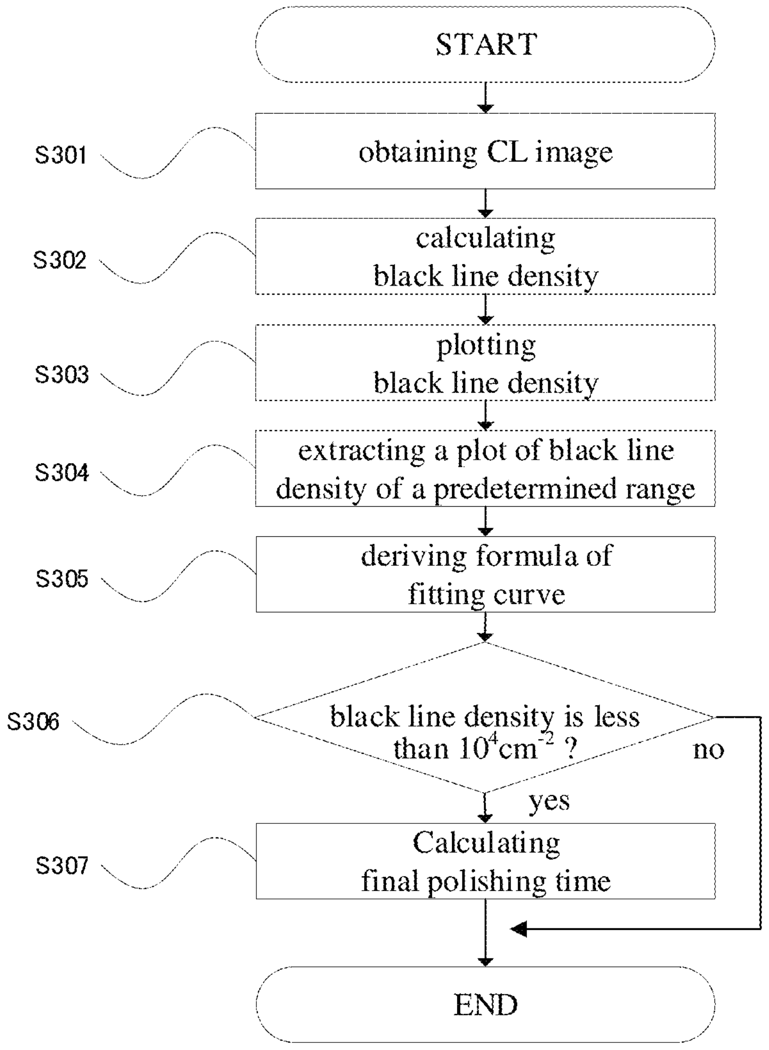
FIG. 9 is a flowchart of a substrate polishing method executed by a substrate polishing device according to the second embodiment.

FIG. 9 is a flowchart of a substrate polishing method executed by the substrate polishing device according to the second embodiment. Since a process of step S301 is the same as that of the first embodiment, the description thereof will be omitted.

The black line density calculating unit 300*b* reads the same image analysis software as in the first embodiment from the storage 53, and calculates the black line density from each obtained CL image (S302). The data extracting unit 300*c* plots the black line density with the calculated black line density as the vertical axis and the polishing time corresponding to the black point density as the horizontal axis (S303), and extracts a plot showing a value in the range of the black line density from $10^6$ $cm^{-2}$ to $10^4$ $cm^{-2}$ (S304).

The fitting linear line deriving unit 300*d* performs fitting with a linear function on the plot of the extracted black line density to derive a formula of fitting linear line (S305). The fitting method in the present embodiment is not particularly limited, but in y=ax+b, fitting can be performed by appropriately assigning numerical values to a and b. Further, it can also be performed by the least squares method.

The fitting linear line deriving unit 300*d* reads out the black line density at the time of finishing the polishing of the target substrate stored in advance in the storage 53. When the read black line density is less than $10^4$ $cm^{-2}$, the threshold is adopted (S306, yes), and the final polishing time is calculated by fitting the threshold to the derived formula (S307). This threshold may be, for example, 1.0 $cm^{-2}$. When the read black line density is $10^4$ $cm^{-2}$ or larger (no in S306), it is determined that the black line density is not the black line density at the time of finishing the polishing of the target substrate, and the processing ends.

As described above, the substrate used in the second embodiment is polished for a polishing time of 0.9 or more times and less than 1 time the upper limit value obtained from the logistic function, the formula (1) or the formula (2). As a preferred aspect of the second embodiment, the black line density calculating unit 300*b* may obtain a CL image before further polishing in S302, measure the black line density, and determine whether or not the black line density is larger than $10^6$ $cm^{-2}$. When the black line density calculating unit 300*b* determines that the black line density is larger than $10^6$ $cm^{-2}$, the black line density calculating unit 300*b* may calculate the black line density from the CL image of each predetermined time in a situation where the substrate is further polished. When the black line density calculating unit 300*b* determines that the black line density is $10^6$ $cm^{-2}$ or less, the black line density calculating unit 300*b* may terminate the step.

This verification result is described in detail below.

Figure 10:
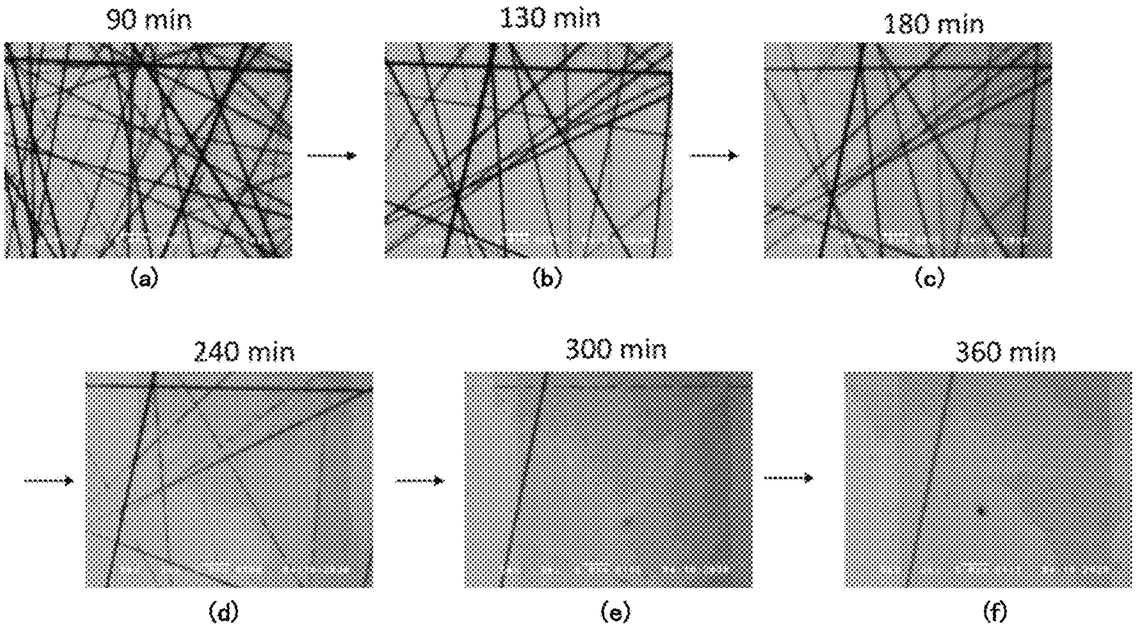

FIG. 10 is a CL image of a substrate polished under the polishing condition 2 of the first embodiment, in which FIG. 10A shows a CL image at a polishing time of 90 minutes, FIG. 10B shows a CL image at a polishing time of 130 minutes, FIG. 10C shows a CL image at a polishing time of 180 minutes, FIG. 10D shows a CL image at a polishing time of 240 minutes, FIG. 10E shows a CL image at a polishing time of 300 minutes, and FIG. 10F shows a CL image at a polishing time of 360 minutes.

Figure 11:
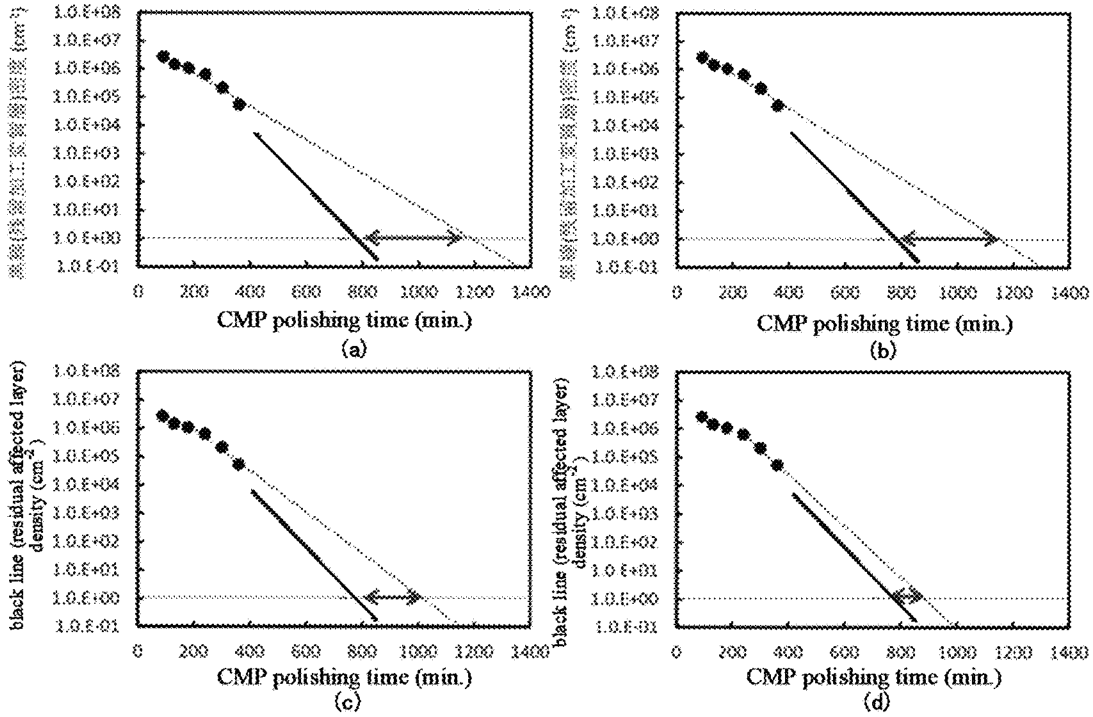
FIG. 11 is a diagram showing the relationship between a black line density obtained from the CL images of FIG. 10 and polishing time.

FIG. 11 is a diagram showing the relationship between a black line density obtained from the CL images of FIG. 10 and polishing time FIG. 11A shows a linear line obtained from actual black line density data and an estimated linear line estimated from a black line density of 90 to 360 minutes, FIG. 11B shows a linear line obtained from actual black line density data and an estimated linear line estimated from a black line density of 130 to 360 minutes, and FIG. 11C shows a linear line obtained from actual black line density data and an estimated linear line estimated from a black line density of 180 to 360 minutes; FIG. 11D shows a linear line obtained from the actual black line density data and an estimated linear line estimated from the black line density of 240 to 360 minutes.

In FIG. 11, diagonal solid lines are lines obtained by actual measurement, and dotted lines are lines obtained by estimation. The range represented by ⇔ represents an estimated time error between the estimated value and the actual measured value of the polishing time.

As shown in FIG. 10, each CL image is obtained, the black line density for each CL image is calculated, and the values are plotted as shown in FIG. 11. It was investigated whether to fit a linear function to a plot of which time period.

When the GaN material was processed under the polishing condition 2 of the first embodiment, the number of black lines in the CL image of about 50 μm square at a polishing time of 90 minutes was 50, and the black line density was $2.6\times10^6$ $cm^{-2}$. When the processing was further continued, 27 and 20 lines were formed at 130 minutes and 180 minutes, respectively, and the densities were $1.4\times10^6$ $cm^{-2}$ and $1.1\times10^6$ $cm^{-2}$, respectively. When the processing was further advanced, the number of black lines became 12, 4, and 1 at a polishing time of 240 minutes, 300 minutes, and 360 minutes, respectively, and the black line densities became $6.3\times10^5$ $cm^{-2}$, $2.1\times10^5$ $cm^{-2}$, and $5.3\times10^4$ $cm^{-2}$, respectively.

Since the number of black lines in the observation area becomes one at a polishing time of 360 minutes, if the polishing is further advanced, the processing field of view needs to be widened for counting the number of black lines, which is not practical. Thus, analysis was performed using black line densities based on the CL images up to 360 minutes.

In performing this analysis, a verification experiment for grasping a decrease in actual black line density is necessary. Therefore, CL observation with a wide observation field of view was performed in advance by spending a large amount of observation time. This is represented by diagonal solid lines in FIG. 11. The interunit of the diagonal solid line and the solid line having a black line density of 1 $cm^{-2}$ corresponds to the total polishing time. As a result, it has been found that the minimum necessary polishing time during which the residual affected layer is actually 1 $cm^{-2}$ or less is 796 minutes.

As shown in FIG. 11A, in the estimation of the polishing time based on the black line density from 90 minutes to 360 minutes, the estimated polishing time needed to achieve a surface with a black line density of 1 $cm^{-2}$ or less for the residual affected layer was estimated to be 1151 minutes. The estimated time error with respect to the actual polishing time of 796 minutes was 355 minutes, and $(355/796)\times100=45\%$. As shown in FIG. 11B, in the polishing time of 130 minutes to 360 minutes, as in the case of 90 minutes to 360 minutes, the estimated time error was 1151 minutes, and $((1151-796)/796)\times100=45\%$.

Next, as shown in FIG. 11C, when the polishing time was 180 minutes to 360 minutes, the estimated polishing time was 1012 minutes, and the estimated time error was reduced to $((1012-796)/796)\times100=27\%$. As shown in FIG. 11D, when the polishing time was 240 minutes to 360 minutes, the estimated polishing time was 877 minutes, and the estimated time error was 81 minutes as compared with the result of the verification experiment, and was reduced to $((877-796)/796)\times100\approx10\%$.

As described above, by estimating the polishing time using the black line density (that is, in the above example, the data at 240 to 360 minutes shown in FIG. 11D) in the range of the black line density of $10^6$ $cm^{-2}$ to $10^4$ $cm^{-2}$, it is possible to significantly reduce the estimated time error to 10%.

As is apparent from the second embodiment, in a material having a slow polishing rate such as GaN, an unnecessary polishing time difference due to an estimated time error of extra polishing time is large. For example, since the error based on the black line density from 90 minutes to 360 minutes is large, if this estimated polishing time is erroneously applied, extra polishing of 355 minutes is required for the originally needed total polishing time of 796 minutes. On the other hand, in the black line density range defined in the second embodiment, it is apparent that it is possible to estimate the originally required polishing time with an extremely small error, and the practical effect is extremely high.

EXPLANATION OF REFERENCE SYMBOLS

10 cathodeluminescence (CL) device
20 electron beam irradiation device
21 electron beam
22 CL light
30 sample stage
40 CL photodetector
50, 300 calculating device
50*a* CL image obtaining unit
50*b* average data calculating unit
50*c* formula deriving unit
50*d* polishing rate calculating unit
51 CPU
52 memory
53 storage
54 input device
55 monitor
56 input/output interface
60 substrate
300*a* CL image obtaining unit
300*b* black line density calculating unit
300*c* data extracting unit
300*d* fitting linear line deriving unit
300*e* final polishing time calculating unit

The invention claimed is:

1. A non-transitory computer-readable storage medium storing therein programming instructions for a polishing state analysis prediction program to predict a future polishing state of a polishing-target substrate to be polished, the instructions, when executed by a computer, causing the computer to perform the steps of:

detecting cathodeluminescence light emitted from the substrate;

obtaining, based on the cathodeluminescence light emitted from the substrate, a cathodeluminescence image of each predetermined time after a start of polishing;

calculating average light emission intensity data or average luminance data from each cathodeluminescence image;

plotting the average light emission intensity data or the average luminance data, and deriving a formula representing a fitting curve resulted from the plotting by using a predetermined function; and calculating a polishing rate based on the formula of the fitting curve.

2. The non-transitory computer-readable storage medium according to claim 1, wherein the predetermined function is a logistic function.

3. The non-transitory computer-readable storage medium according to claim 1, wherein the predetermined function is represented by formula (1) or formula (2) below:

$$I(t) = \frac{H}{1 + e^{-2a(t-T)}} \tag{1}$$

$$L(t) = \frac{G}{1 + e^{-2a(t-T)}} \tag{2}$$

wherein the formulas (1) and (2), I(t) is light emission intensity of CL light at a time t in the polishing, H is an upper limit value of the formula (1), L(t) is luminance at a time t in the polishing, G is an upper limit value of the formula (2), and T and a are constants obtained when deriving each formula of the fitting curve.

4. A non-transitory computer-readable storage medium storing therein programming instructions for a polishing state analysis prediction program to predict final polishing time of a polishing-target substrate to be polished, the instructions, when executed by a computer, causing the computer to perform the steps of:

detecting cathodeluminescence light emitted from the substrate;

obtaining, based on the cathodeluminescence light emitted from the substrate, a cathodeluminescence image of each predetermined time after a start of polishing;

calculating a black line density from each cathodeluminescence image;

plotting each calculated black line density and extracting a plot of a polishing time range in which the black line density decreases from $10^6$ $cm^{-2}$ to $10^4$ $cm^{-2}$;

fitting a plot of a polishing time range in which the black line density decreases from $10^6$ $cm^{-2}$ to $10^4$ $cm^{-2}$ by using a linear function; and calculating, as the final polishing time, a time which is taken for the black line density in the formula to reach a threshold of less than $10^4$ $cm^{-2}$.

5. A cathodeluminescence device configured to predict a future polishing state of a polishing-target substrate to be polished, the device comprising:

an electron beam irradiation device configured to emit an electron beam onto the substrate;

a cathodeluminescence photodetector configured to detect cathodeluminescence light emitted from the substrate; and a calculation device comprising a central processing unit and a computer-readable storage medium storing programming instructions that, when executed by the central processing unit, cause the central processing unit to:

obtain, based on the cathodeluminescence light emitted from the substrate and detected by the cathodeluminescence photodetector, a cathodeluminescence of each predetermined time after a start of polishing;

calculate an average light emission intensity data or average luminance data of each cathodeluminescence image; and plot the average light emission intensity data or the average luminance data, and derive a formula of a fitting curve resulted from the plotting by using a predetermined function; and calculate a polishing rate based on the formula of the fitting curve.

6. A cathodeluminescence device configured to predict a final polishing time of a polishing-target substrate to be polished, the device comprising:

an electron beam irradiation device configured to emit an electron beam onto the substrate;

a cathodeluminescence photodetector configured to detect cathodeluminescence light emitted from the substrate; and a calculation device comprising a central processing unit and a computer-readable storage medium storing programming instructions that, when executed by the central processing unit, cause the central processing unit to:

obtain, based on the cathodeluminescence light emitted from the substrate and detected by the cathodeluminescence photodetector, a cathodeluminescence image of each predetermined time after a start of polishing;

calculate a black line density from each cathodeluminescence image obtained;

plot each black line density calculated and extract a plot of a polishing time range in which a black line density decreases from $10^6$ $cm^{-2}$ to $10^4$ $cm^{-2}$;

perform a linear function fitting in the plot, and derive a formula representing a fitting linear line; and calculate, as final polishing time, a time which is taken for a black line density in the formula to reach a threshold of less than $10^4$ $cm^{-2}$.

7. A computer-implemented polishing state analysis prediction method to predict a future polishing state of a polishing-target substrate to be polished, the polishing state analysis prediction method comprising:

emitting an electron beam onto the substrate;

detecting cathodeluminescence light emitted from the substrate;

obtaining, based on the cathodeluminescence light emitted from the substrate, a cathodeluminescence image of each predetermined time after a start of polishing;

calculating average light emission intensity data or average luminance data of each cathodeluminescence image;

plotting the average light emission intensity data or the average luminance data, and deriving a formula representing a fitting curve resulted from the plotting by using a predetermined function; and calculating a polishing rate based on the formula of the fitting curve.

8. A computer-implemented polishing state analysis predicting method to predict final polishing time of a polishing-target substrate to be polished, the polishing state analysis prediction method comprising:

emitting an electron beam onto the substrate;

detecting cathodeluminescence light emitted from the substrate;

obtaining, based on the cathodeluminescence light emitted from the substrate, a cathodeluminescence image of each predetermined time after a start of polishing;

calculating a black line density from each cathodeluminescence image;

plotting each calculated black line density to derive a formula representing a fitting linear line;

fitting a plot of a polishing time range in which a black line density decreases from $10^6$ $cm^{-2}$ to $10^4$ $cm^{-2}$ by using a linear function; and calculating, as final polishing time, a time which is taken for the black line density in the formula to reach a threshold of less than $10^4$ $cm^{-2}$.

9. The cathodeluminescence device according to claim 5, wherein the predetermined function is a logistic function.

10. The cathodeluminescence device according to claim 5, wherein the predetermined function is represented by formula (1) or formula (2) below:

$$I(t) = \frac{H}{1 + e^{-2a(t-T)}} \quad (1)$$

$$L(t) = \frac{G}{1 + e^{-2a(t-T)}} \quad (2)$$

where in the formulas (1) and (2), I(t) is light emission intensity of CL light at a time t in the polishing, H is an upper limit value of the formula (1), L(t) is luminance at a time t in the polishing, G is an upper limit value of the formula (2), and T and a are constants obtained when deriving each formula of the fitting curve.

* * * * *